United States Patent [19]

Kennedy

[11] 3,999,648
[45] Dec. 28, 1976

[54] APPARATUS FOR DISTRIBUTING ARTICLES INTO SELECTED TRAVEL PATHS

[75] Inventor: Francis Millard Kennedy, Lynchburg, Va.

[73] Assignee: Simplimatic Engineering Co., Lynchburg, Va.

[22] Filed: Aug. 18, 1975

[21] Appl. No.: 605,460

[52] U.S. Cl. .............................. 198/437; 198/442; 198/578
[51] Int. Cl.[2] ........................................ B65G 47/26
[58] Field of Search ........... 198/31 AC, 31 AB, 30, 198/40, 86, 112

[56] References Cited
UNITED STATES PATENTS

| 630,279 | 8/1899 | Wilson | 198/86 X |
|---|---|---|---|
| 2,959,269 | 11/1960 | Kammerer | 198/31 AC |
| 3,193,078 | 7/1965 | Amenta et al. | 198/31 AC |
| 3,822,006 | 7/1974 | Shuttleworth | 198/31 AC |

*Primary Examiner*—Evon C. Blunk
*Assistant Examiner*—Douglas D. Watts

[57] ABSTRACT

The present invention relates to dividing a stream of articles into several streams. The operation is accomplished by moving articles along a horizontally swinging conveyor. The operation of the conveyor may be changed by changing a programming card. Thus the conveyor may be programmed to provide for a various number of rows of various widths.

28 Claims, 13 Drawing Figures

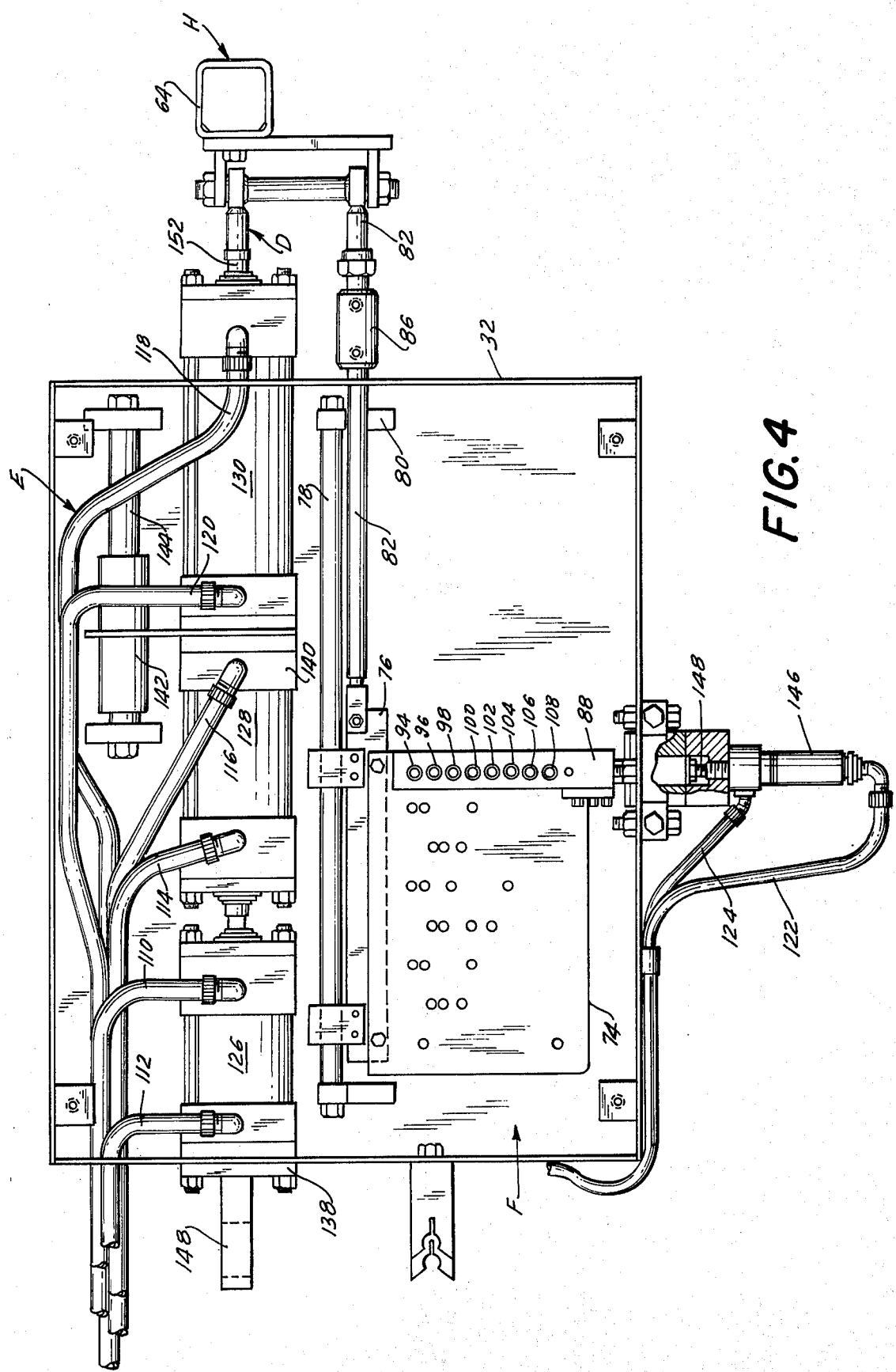

APPARATUS FOR DISTRIBUTING ARTICLES INTO SELECTED TRAVEL PATHS

The present invention relates to materials handling apparatus and, more particularly, to an apparatus for distributing articles into selected travel paths.

Materials handling systems used on production lines and the like often comprise apparatus for continuously moving a stream of articles from one location to another, such as from one work station to the next or from an assembly or manufacturing station to a packaging station. It is sometimes necessary to divide the main stream of articles being conveyed into two or more different travel paths. Such may be required, for instance, if a subsequent operation cannot be performed at a single station quickly enough to accommodate all of the articles traveling on the main conveyor. To avoid slowing down the movement of the articles through the previous station, the main stream of articles may be divided into several travel paths, each leading to a different station. The slower operation may then take place at each of the different stations simultaneously.

For instance, article packaging may not be able to be performed as quickly as the articles are transported on the conveyor from the manufacturing operations. Thus, in order to maintain the speed of the manufacturing process, the main stream of articles is divided into a plurality of travel paths, each of which is directed towards a different packaging station. All of the packaging stations are packaging articles simultaneously and, thus, the packaging operation may be performed without slowing down the line.

It may be desirable to divide the main article stream into a plurality of travel paths for reasons other than seed. For example, if bottles are being manufactured, it may be necessary that some of the bottles be processed differently. Some of the bottles may require one type of label where other bottles may require another type of label. On the other hand, some of the bottles may be packaged in containers having a given number of bottles per container and other bottles may be required to be packaged into containers having a different number of bottles per container.

Various devices have been developed to achieve this result. To some extent, the structure of the device is dependent upon the type of articles being distributed. However, in general, these devices incorporate an article moving means having a structure with means thereon defining a plurality of lanes or paths for article travel. Each of the article paths or lanes has an entrance port or opening located in a common area. Means for conveying the articles to the common area and for directing the articles into selected ones of the travel paths is provided.

The conveying and distributing functions may be combined or separate, depending upon the type of articles being distributed. For instance, if the articles are of the type which may be conveyed by fluid pressure, for example, ping pong balls, this last mentioned means may comprise a movable tube through which the balls are moved by air pressure. The tube is moved such that the exit end thereof registers with each of the article travel paths or lanes in a prescribed manner. If, on the other hand, the articles are of such a nature that they are normally moved on a conveyor of the endless belt type, a movable guide may be positioned above the conveyor leading to the common area. As the articles are moved to the common area within the guide, tthe guide may be moved transversely relative to the conveyor such that the exit end thereof registers with the entrance ports of each of the lanes in the prescribed manner. Thus, depending upon the nature of the article being moved, the means for conveying the article to the common area and the means for directing the articles into selected ones of the paths may be separate structures or combined into a single structure.

In any case, some apparatus must be provided for controlling the movement of the guide and, thus, the distribution of the articles. It is preferable to design the control portion of the apparatus such that the distribution seuence is readily alterable, thereby greatly enhancing the versatility of the apparatus. This would enable the apparatus, for example, to distribute articles equally into a plurality of lanes or to direct twice as many articles into one travel path, depending upon the speed of the operation at the station to which the travel path leads. Such versatility greatly enhances the usefulness of the apparatus by permitting the overall production line to function at maximum efficiency.

In some instances, it may be desirable to convert the number of travel paths from an odd number to an even number. This may require a displacement of the entire set of points of registration between the exit end of the guide and the respective entrance ports of the lanes. This is because the entrance ports of the respective lanes in a set of lanes consisting of an odd number will be laterally displaced with respect to the entrance ports of the respective lanes in a set of travel paths consisting of an even number of lanes if the lanes are symmetrically located. Thus, the registration points of the exit end of the guide must be displaceable to accommodate either of these situations. Often, this may mean adjusting the position of the registration points of the guide one-half the width of a lane. Thus, it is desirable to have the apparatus adjustable in this regard to accommodate an even or an odd number of travel paths.

Production lines are often set up to handle articles of a variety of different sizes and/or shapes and, thus, in order to have a distributing apparatus capable of accommodating articles of different sizes and/or shapes, it is necessary that the lanes or paths of article travel have a variable width. In order to accommodate article paths of different widths, it is necessary that the distance between the positions of the exit end of the guide at each registration point be adjustable. Thus, the amount of movement of the exit end from one registration position to the next must be variable such that registration of the exit end of the guide with the entrance ports of the lanes is assured regardless of the width of the lanes.

Some mechanical apparatus must be provided to displace the exit end of the guide a given number of discrete preset distances such that registration with the entrance ports of the respective lanes is achieved. If the width of the lanes is varied, a modification of the extent of movement of the exit end of the guide between sequential registration points must be made. This can be achieved either by changing the discrete distances through which the mechanical apparatus moves the guide means or by varying the length of the moment arm through which the guide moving means operates. Adjusting the movement mechanism is often an intricate and time consuming task and thus is to be avoided, if possible. Therefore, it is desirable that the apparatus be modifiable to accommodate travel paths of different widths by simply adjusting the linkage between the guide moving means and the guide.

The guide moving means in itself forms an important portion of the apparatus and the proper functioning of the apparatus depends, in large part, upon the guide moving means. This means must be capable of moving the guide in an exacting manner without overshooting or undershooting the desired distance to assure proper registration of the exit end of the guide with the input ports of the lanes. Any errors in the displacement of the linkage between the moving means and the guide will be amplified through the length of the moment arm through which the moving means operates such that misregistration will occur. Further, the guide moving means must operate at a speed sufficient to accommodate all of the articles in the production line and do so in the appropriate sequence. Thus, the response time of the movement means must be short, but the accuracy thereof must be high.

It is, therefore, the prime object of the present invention to provide an apparatus for distributing articles into selected travel paths wherein the sequence of distribution is variable and controlled by means of a programmable mechanism.

It is another object of the present invention to provide apparatus for distributing articles into selected travel paths wherein the apparatus is adjustable to accommodate an even number or odd number of travel paths.

It is a further object of the present invention to provide an apparatus for distributing articles into selected travel paths wherein the guide is displaced through a given number of discrete preset distances by an accurate, pneumatically operated moving means having a fast response time.

It is a still further object of the present invention to provide an apparatus for distributing articles into selected travel paths wherein the linkage between the moving means and the pivotally mounted guide is adjustable relative to the pivot point such that the apparatus can accommodate travel paths of different widths.

In accordance with the present invention, an article moving means is provided of the type having a structure with means thereon defining the plurality of paths for article travel, each of the paths beginning at a common area. Means for conveying articles to the common area and for directing the articles into selected ones of the paths are provided. The last mentioned means includes a guide movably mounted on the structure and having an exit end selectively movable by a guide moving means into registration with a selected one of the paths.

Means are provided for controlling the guide moving means and thus the position of the guide. The control means includes a programming member having programming elements spaced thereon, and means sensing the programming elements. The guide moving means positions the guide in accordance with the sensed elements.

The programming member is moved with respect to the sensing means in accordance with the movement of the guide. The programming member has first and second sets of programming elements present thereon. These sets of elements are offset from each other such that one set of elements is alignable with the sensing means when the guide is being moved in one direction and the other set of elements is alignable with the sensing means when the guide is being moved in the other direction. This permits different distribution sequences when the guide is moving in different directions.

The guide moving means is operably connected to displace the pivotally mounted guide through a given number of discrete preset distances such that the exit end of the guide is moved to align with a selected one of a set of registration points to distribute the articles. Means are provided for adjusting the position of the moving means relative to the remainder of the apparatus to displace the entire set of registration points between a first position wherein the exit end of the guide registers with selected paths from a first set of travel paths having an even number of paths and a second position wherein the exit end of the guide registers with selected paths from a second set of travel paths having an odd number of paths. The paths in the first set of travel paths are offset from the paths in the second set of travel paths by a distance equal to one-half the width of a path. Thus, the position of the moving means can be adjusted such that the guide can distribute articles into an odd number or an even number of travel paths.

An adjustable linkage is provided for adjusting the point of connection between the guide moving means and the guide to accommodate travel paths of different widths. The guide is pivotally mounted to the apparatus and connected to the moving means by means of a linkage which is movable along the guide in a direction perpendicular to the guide. The point of connection between the linkage and the guide determines the moment arm through which the moving means operates and thus the amount of movement produced at the exit end of the guide for a given movement of the linkage. Thus, by adjusting the point of connection between the linkage and the guide (and thus the length of the moment arm) with respect to the pivot point, the amount of movement of the exit end of the guide for a given displacement of the linkage, can be regulated. In this manner, the apparatus can accommodate travel paths of different widths without varying the discrete distances to which the linkage is moved.

The guide moving means includes a housing, a first cylinder mounted to the housing and a second cylinder movably mounted relative to the housing. First and second pistons are movably mounted within the cylinders, respectively. The piston and cylinder in the first pair are relatively movable with respect to each other through a distance of one unit. The piston and cylinder in the second pair are relatively movable with respect to each other a distance of two units. Means are provided for operably connecting the pistons for simultaneous movement. The pistons are pneumatically operated in accordance with the control means such that each of the pistons is movable relative to its repective cylinder between first and second positions. The linkage is operatively connected to the second cylinder. With this design, the linkage can be moved to one of three discrete positions by actuating one or the other piston-cylinder combinations, or both. It is possible to aggregate the movement of both pistons because the second piston-cylinder combination is not only movable relative to each other but also as an entity movable relative to the housing.

A third piston-cylinder pair, the cylinder of which is operatively connected to the second cylinder and, therefore, also movably mounted with respect to the housing, may be provided. This piston and cylinder pair are relatively movable with respect to each other a distance of four units. This third piston-cylinder pair, in combination with the other two piston-cylinder pairs, permits the movement of the linkage to any one of eight discrete positions.

To the accomplishment of the above and to such other objects as may hereinafter appear, the present invention relates to apparatus for distributing articles into selected travel paths as set forth in the annexed claims and as described in the specification, taken together with the drawings wherein like numerals refer to like parts and in which:

FIG. 4 is a cutaway view of the control means and movement mechanism of the apparatus of the present invention;

Figure 1:
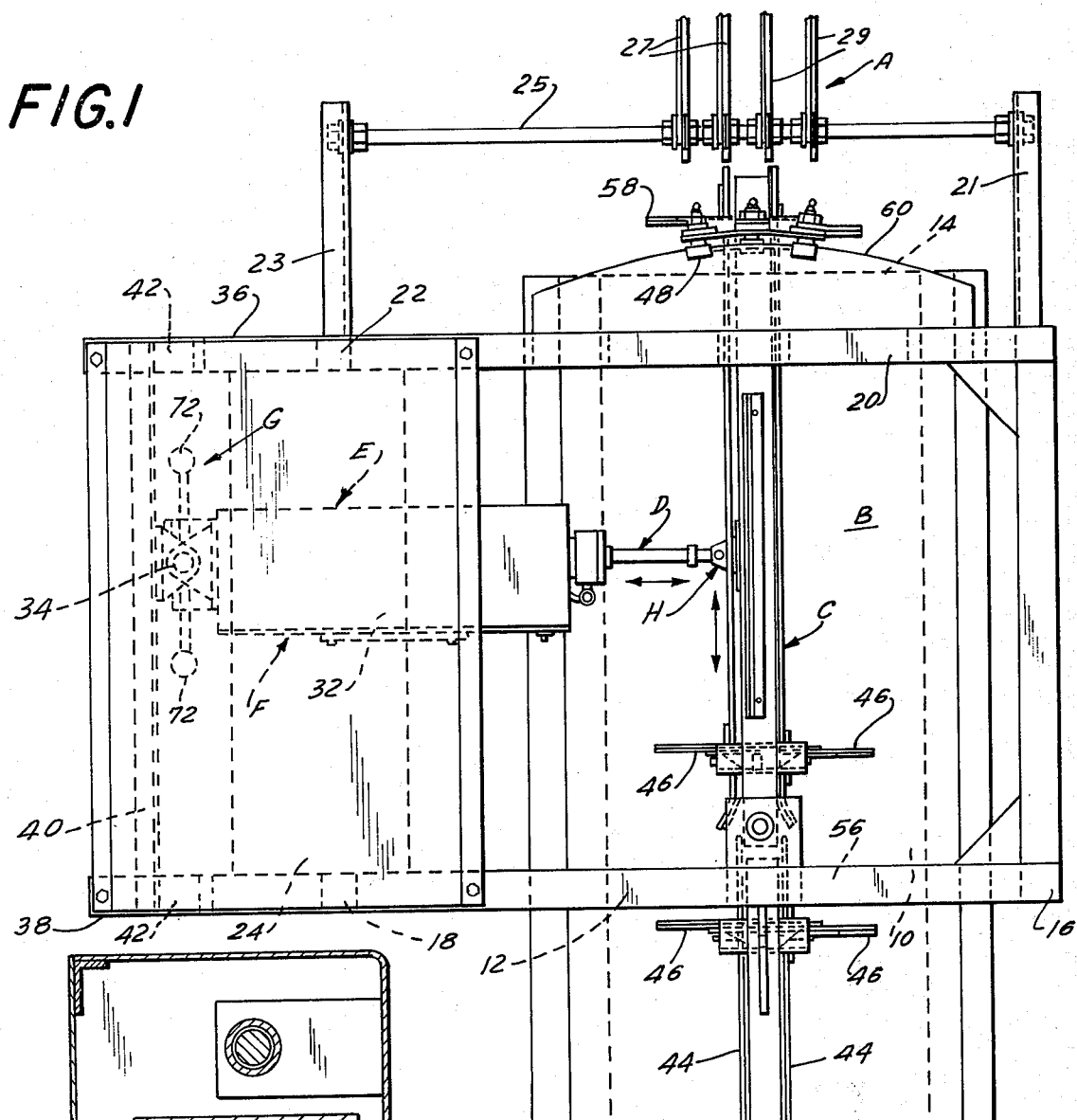
FIG. 1 is a plan view of the present invention.

The present invention comprises a means, generally designated A, defining a plurality of lanes or paths for article travel, each of which has an entrance port at a common area. Means, generally designated B, are provided for conveying articles to the common area. Means, generally designated C, located adjacent conveyor B includes a guide for directing the articles into selected ones of the article travel paths A as the articles are moved along conveyor B. Guide C is movably mounted with respect to conveyor B and has an exit end selectively movable in a direction transverse to the conveyor to a selected one of a set of registration points such that it aligns with a selected one of the article travel paths.

A linkage element, generally designated D, forms a connection between guide C and a guide moving means, generally designated E. Means E displaces element D a given number of discrete preset distances such that guide C is moved relative to conveyor B. This causes the exit end of the guide C to register with one of a set of registration points and thus align with a selected article travel path A. Guide moving means E is controlled by a control means, generally designated F. Control Means F comprises a programming member having programming elements spaced thereon and means for sensing the elements on the member such that guide moving means E will displace linkage element D in accordance with the information contained in the sensed elements.

An adjustment means, generally designated G, is provided to move guide moving means E with respect to conveyor B such that the sets of registration points is displaced a distance equal to one-half the width of one of the article travel paths A. Displacing the set of registration points permits the exit end of guide C to align with the travel paths in a set of travel paths having odd number of travel paths in a set of travel paths having an even number.

Linkage element D is operatively connected to guide C by means of an adjustable bracket, generally designated H, which permits the point of connection between the element D and the guide C to be varied. Variation in the location of the point of connection between element D and guide C will change the moment arm through which moving means E operates and thus the distance which the exit end of guide C is moved for a given displacement of element D. Since element D can be displaced by guide moving means E through only a given number of discrete preset distances, adjustment of the length of the moment arm permits the apparatus of the present invention to accommodate articles and travel paths of different widths.

Conveyor B, which may take the form of any conventional conveying apparatus, such as an endless belt, passes over a conveyor support 10. Support 10 rests on a pair of horizontal frame members 12, 14 which form a portion of the frame structure. Horizontal frame member 12 extends between two upstanding frame members 16, 18 and, in a similar fashion, horizontal member 14 extends between upstanding frame members 20, 22.

Extending horizontally in the direction of movement of conveyor B, but spaced therefrom on upstanding frame members 20 and 22, respectively, are frame members 21 and 23. Connecting frame members 21 and 23 is a rod 25 which extends transversely to conveyor B. A plurality of upstanding lane guide brackets 27 are movably mounted on rod 25 at spaced intervals. Connected to the bottom of each of the brackets 27 is a line divider 29 forming the lanes or travel paths which are situated to receive the articles as they leave the exit end of guide C. Brackets 27 are movably mounted on rod 25 such that the distance between dividers 29 can be varied to change the width of the lanes or travel paths. After the brackets 27 are properly positioned with respect to rod 25, the brackets are retained in position by the appropriate means, such as set screws.

While only three lanes are shown for purposes of illustration, it should be understood that as many lanes as desirable could be formed. Further, the lanes can be shifted such that a set of lanes having an even number can be centered.

A master control box 24, containing on/off switches for the electrical and pneumatic systems of the apparatus is connected to the frame by means of horizontal frame members 26, 28 which extend between upstanding frame members 18 and 22. In addition, horizontal frame members 30 and 32 join upstanding frame members 18, 22 and 16, 20, respectively, for additional structural rigidity. Upstanding frame members 16, 18, 20 and 22 extend above the surface of conveyor B to permit the remainder of the apparatus to be mounted above conveyor B.

A housing 32, which contains guide moving means E and control means F, is pivotally connected to the frame by means of a pin 34 which, in turn, is slidably mounted by means of screws 37, 39 to a frame member 40 connected between brackets 42. Brackets 42 are, in turn, connected to horizontal frame members 36 and 38, respectively. Horizontal frame member 36 is connected to the top of upstanding frame members 20 and 22. In a similar manner, horizontal frame member 38 is connected to the top of upstanding members 16 and 18.

Housing 32 is pivotally mounted to the frame to permit the variation in the moment arm through which moving means E acts, as explained below, by moving the point of connection between the linkage element D and guide C along guide C. However, this movement of the element D is necessarily arcuate because of the pivotal connection. Therefore, when element D is moved through a substantial arc, the perpendicular distance between pin 34 and guide C will be shortened.

Thus, when the length of the moment arm must be changed appreciably, it is desirable to move housing 32 along frame member 40 such that the perpendicular distance between the pin 34 and guide means C is not adversely affected. However, for small adjustments, pivoting housing 32 about pin 34 is all that is required.

Guide C consists of a pair of parallelly situated upstanding guide rails 44 spaced from conveyor B a small distance such that articles, such as bottles, being conveyed by conveyor B pass between guide rails 44 which, in turn, determine the direction of motion of the articles with respect to the conveyor. Guide rails 44 are held in position by a plurality of pairs of guide rail support brackets 46, each pair of which, in turn, is mounted on an adjustable bracket 48 such that the brackets of each pair can be laterally moved with respect to each other to adjust the spacing between guide rails 44 and thus to enable the apparatus of the present invention to accommodate articles of varying widths.

Some of the brackets 48 are connected to a horizontal bar 50 which is pivotally mounted by means of a pin 52. Pin 52 is connected by means of a bracket 54 to a horizontal frame member 56 connected to upstanding members 16 and 18 below member 38. Other of the brackets 48 are connected to a stationary member 51, also extending from member 56. The guide rail support brackets 46 connected to the exit end of guide rails 44 are supported by a bracket guide 58 which is movably mounted to a convex lip 60 extending from horizontal frame member 36 to permit pivotal movement of the guide C about pin 52 while providing additional stability.

Guide C is thus pivotally mounted to the frame with respect to conveyor B and, thus, movable about a point defined by pin 52. Guide C is moved as element D is displaced. Element D is displaced by guide moving means E through a given number of discrete preset distances. Each of the discrete distances is equal and these distances are not variable. In order to vary the extent of movement of the exit end of guide C with respect to article travel lanes A due to a given displacement of element D, element D is connected to guide C by means of an adjustable bracket H. Bracket H comprises a rectangular bracket 64 which substantially surrounds member 50 and which is adjustably positionable along member 50. Bracket 64 moves along with housing 32 and, thus, is positioned by the pivoting of housing 32 about pin 34 or the movement of pin 34 along frame member 40.

Thus, as the distance between the pivot point 52 and the point of connection between element D and member 50 is varied, the distance which the exit end of guide C will move for a given displacement of element D is modified. Changing the point of connection between element D and guide C changes the length of the moment arm through which guide moving means operates. This, in effect, varies the distance between the points in the set of registration points to which the exit end of guide C is movable.

The pivotal connection through pin 34 of housing 32 with bracket 40 serves the additional function of providing a means of varying the position of housing 32 with respect to the remainder of the frame in a direction transverse to the conveyor B. Pin 34 has mounted thereon a handle 72 which can be placed in one of the two positions shown in FIG. 1. The rotation of handle 72 from one position to the other causes housing 32 to be moved with respect to conveyor B a distance equal to one-half of the width of one of the article travel paths A. This is accomplished through the use of an eccentric cam (not shown) movably mounted on pin 34, which, when handle 72 is moved from one position to the other, causes housing 32 to move in a direction which is substantially perpendicular to guide C.

As shown in FIG. 1, the set of article travel paths A comprises three paths, and thus an odd number. Guide means C is shown with the exit end thereof in registration with the middle travel path. However, if an even number of travel paths were being utilized, and the paths were positioned symmetrically, namely, with an equal number of lanes on each side of a point aligned with the center of the middle article travel path as shown in FIG. 1, guide C would have to be moved from the position shown in FIG. 1 one-half the width of a travel path in order to properly register with one of the travel paths in the even set. In other words, to compensate for a change in the number of lanes from odd to even, the set of registration points must be displaced a distance equal to one-half the width of a lane.

Means G achieves this result by permitting housing 32 to be displaced transversely with respect to the remainder of the frame by distance equal to one-half the width of a lane, thereby enabling the apparatus to accommodate sets of lanes having either odd or even numbers. It should be noted that the entire housing 32 is moved and, thus, this does not in any way affect guide moving means E or the discrete preset distances to which element D is displaced.

As most clearly shown in FIG. 4, housing 32 contains guide moving means E for displacing element D and means F for the control thereof. Moving means E comprises a series of pneumatically operated piston-cylinder pairs which control the position of element D in accordance with the pressurization or depressurization of selected pneumatic conduits, two of which are connected to each piston-cylinder pair. The pressurization and depressurization of the pneumatic conduits is selectively achieved by means of control means F which operates a series of valves located within a valve shield 66 mounted on frame members 36 and 38.

Control means F comprises a programming member 74 having a flat card-like configuration and being composed of a relatively rigid material such as plastic, metal or heavy cardboard, fashioned into a substantially rectangular shape. Member 74 is mounted on a carrying bracket 76 which, in turn, is movably mounted along a bar 78 between brackets 80 which connect bar 78 to the wall of housing 32. Bracket 76 is operatively connected to element D by means of a feedback rod 82 and a pin 84 which is connected to element D. The length of rod 82 can be varied by means of a collar 86 which connects the portions of rod 82 on each side thereof. A pair of set screws are provided on collar 86 such that the parts of rod 82 can be moved relative to each other to vary the overall length thereof.

Figure 5:
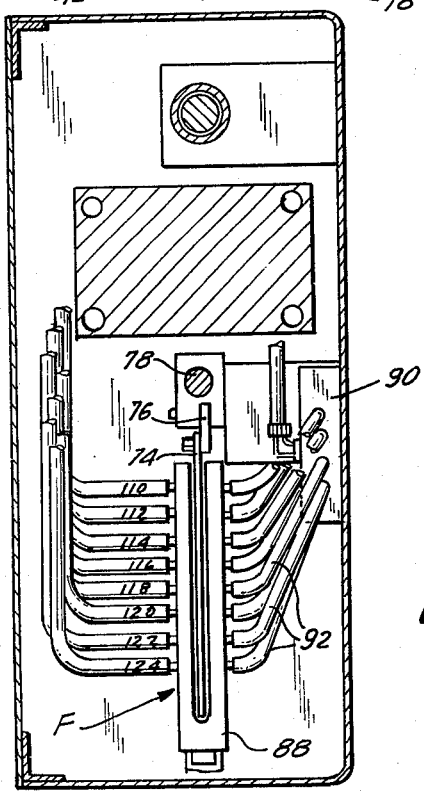
FIG. 5 is a top view of the control means of the present invention.
Figure 2:
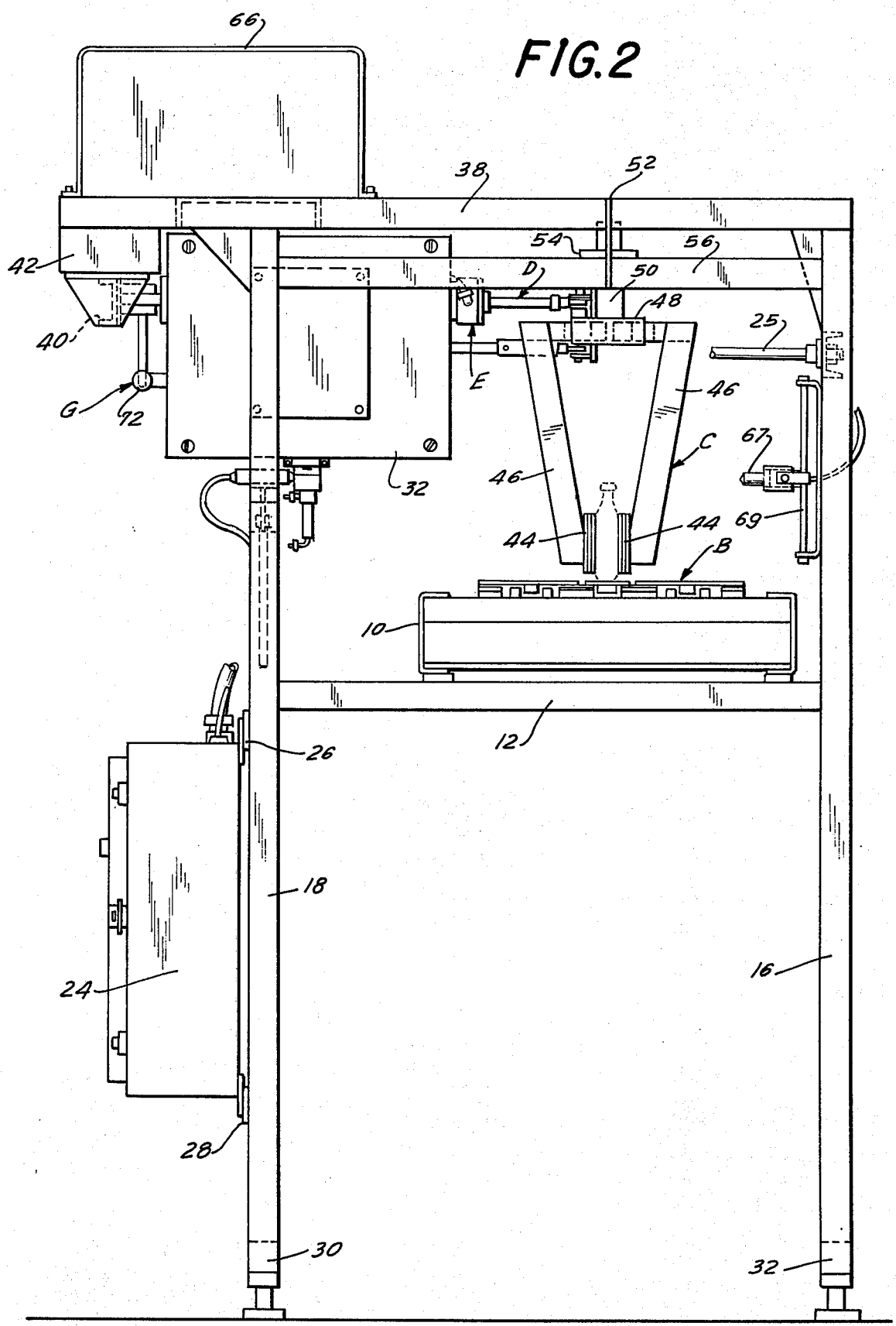
FIG. 2 is an end view of the apparatus of the present invention.

Variability in the overall length of bar 82 is necessary to insure that the appropriate portions of member 74 are properly aligned with sensing means 88. Member 74 has a plurality of programming elements spaced along the surface thereof. As seen in FIG. 4, these elements take the form of openings or apertures which extend through the member. As best seen in FIG. 5, sensing means 88 comprises two portions with a slot or recess therebetween shaped to receive member 74 edgewise.

Each of the portions of sensing means 88 is provided with eight apertures or openings arranged in linear fashion. The openings on one part of sensing means 88 have a one-to-one correspondence with the openings on the other such that each opening on one portion aligns with the corresponding opening on the other portion. The apertures on one portion are each connected to a source 90 of pressurized fluid, such as compressed air, by means of a separate pneumatic conduit 92. Each of the apertures on the other portion designated 94, 96, 98, 100, 102, 104, 106, 108, respectively, is operably connected to a pneumatic conduit 110, 112, 114, 116, 118, 120, 122, 124, respectively. Pneumatic conduits 110–124 are each connected to operate a pressure sensitive valve (not shown) mounted within valve shield 66. The valves within valve shield 66 cause the pneumatic conduits connected to the piston-cylinder pairs to be connected to a source of pressurized fluid. Each of these latter conduits corresponds to one of the former conduits. For simplicity and ease of explanation, the corresponding conduits are given the same number although it is understood that these conduits are actually each associated with the corresponding conduit through the appropriate valve.

Moving means E comprises three cylinders 126, 128 and 130 having pistons 132, 134 and 136, respectively, movably mounted therein. Cylinder 126 is connected to the wall of housing 32 by means of bracket 138. Thus, cylinder 126 is fixedly mounted to the housing. Cylinders 128 and 130 are connected together by means of a bracket 140 which is connected to collar 142 movably mounted on rod 144 which, in turn, is connected to the wall of housing 32. Thus, cylinders 128 and 130 are movable with respect to the housing and, in addition, with respect to cylinder 126.

Pneumatic conduits 110 and 112 are connected to cylinder 126 at opposite sides of piston 132. Pneumatic conduits 114 and 116 are connected to cylinder 128 at opposite sides of piston 134. Pneumatic conduits 118 and 120 are connected to cylinder 130 at opposite sides of piston 136. Pneumatic conduits 122 and 124 are connected to an additional cylinder-piston pair 146 which is connected to sensing means 88. Cylinder-piston pair 146 serves to move sensing means 88 in a direction perpendicular to the movement of member 74 in order to achieve a reversal of direction of the element D, as described in detail below.

The pneumatically operated cylinders 126, 128 and 130 operate in a conventional manner. When compressed air is forced through one of the pneumatic conduits into the area between the cylinder wall and the piston, the piston is moved in a direction away from the cylinder wall. The piston and the cylinder move relative to each other such that the space between the cylinder wall and the piston where the compressed air is injected becomes larger. Each cylinder-piston pair has two pneumatic conduits such that the piston and cylinder can be moved relative to each other in one of two directions, depending upon which of the pneumatic conduits is provided with the pressurized fluid.

The guide moving means E herein is illustrated as being capable of displacing element D to any one of eight positions which are spaced apart by equal distances. It should be understood, however, that this specific design is described herein for purposes of illustration only and that element D can be displaced through as many different positions as is necessary by including additional piston-cylinder pairs.

Sensing means 88 is actuated to sense the elements on member 74 each time an article or a pre-determined number of articles moves past a given point on conveyor B. Actuation of sensing means 88 takes place by means of an actuation signal generated by a counter (not shown). The counter is a conventional resettable counter responsive to an electronic input signal which can be pre-set to generate an actuation signal when the entry therein is a pre-determined number. Thus, the actuation signal may be generated when the counter entry is any given number. The input to the counter is connected to a photosensitive signal generating means 67, also of conventional design. Photo cell 67 generates an input signal to the counter each time an article passes through a light beam to interrupt the light incident thereto. In this manner, the actuation signal is generated after the pre-determined number of articles have been sensed. The actuation signal energizes sensing means 88 to initiate the shifting sequence.

Figure 3:
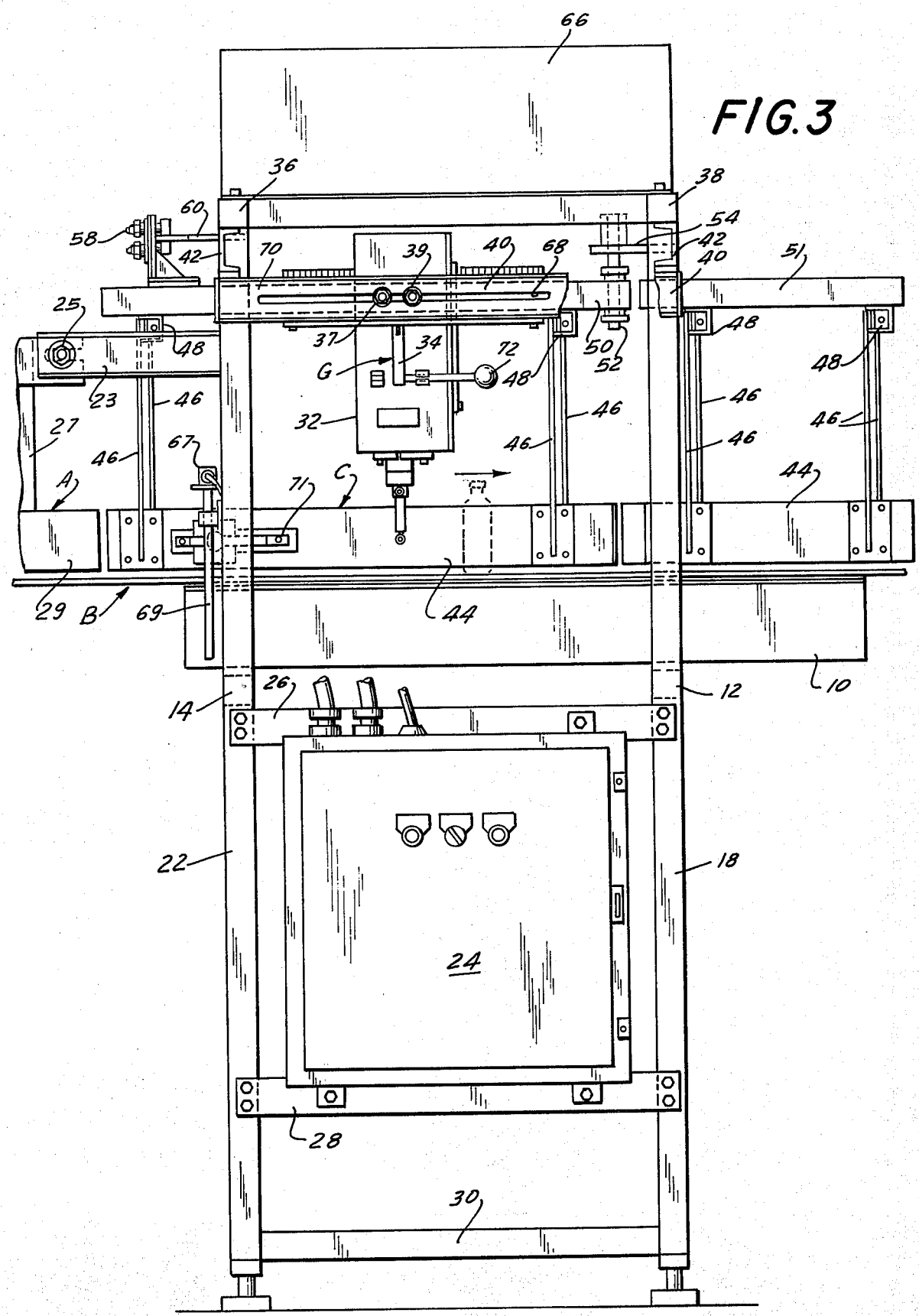
FIG. 3 is a side view of the apparatus of the present invention.

A brake 71, shown in FIG. 3, when actuated stops the flow of articles into the lanes at a point prior to the photo cell 67. Brake 71 is actuated, and thus retains the incoming articles, until the previous shifting operation is completed. Then the brake is released, articles travel down the conveyor towards the lanes and are sensed by photo cell 67 and counted by the counter. When the pre-determined number of articles have passed photo cell 67, the actuation signal is generated, the brake is closed, the counter reset and sensing means 88 actuated.

This permits the articles to travel on the conveyor in "back-to-back" condition (not spaced from each other along the conveyor). In addition, this design permits a pre-determined number of articles to enter each path between each shifting sequence. Thus, the articles can be distributed in groups rather than single units. As a result, more articles can be distributed in a given time interval because non-productive shifting time is reduced. For the purposes of simplicity in the following explanation, however, the apparatus of the present invention is described as distributing appropriately spaced articles on a unit basis, thus not requiring grouping by brake 71.

Photo cell 67 is mounted by a bracket 69 to member 20 at a point along guide C near the exit end thereof. When an article traveling along guide C is sensed by photo cell 67, the actuation signal is generated by the counter and sensing means 88 is caused to read member 74 thereby controlling moving means E to move guide C until the exit end thereof registers with the desired travel path A. The articles on the conveyor can be spaced such that one article leaves the exit end of guide C prior to the time when the next article crosses the photo cell beam or can be next to each other and formed into groups by brake 71, as described above.

The piston-cylinder pairs have different ranges, namely, one, two and four units, respectively. In addition, the pairs are connected such that the respective movements can be summed. In this manner, the movement of guide C is the aggregate of the movements of each of the pairs and can assume any one of eight different discrete positions.

FIGS. 6A–6H show schematically the eight positions of the cylinder-piston pairs, respectively. As shown in FIGS. 6A–6H, one side of cylinder 126 is connected to a rod 148 which, in turn, is connected to pin 34 and, thus, pivotally connected to the apparatus frame. One side of piston 132 is connected to a rod 150 which, in turn, is connected to one side of piston 134. One side of piston 136 is connected to a rod 152 which is connected to element D. It should be noted that piston 134 and piston 136 are not directly connected.

When element D is in its initial or starting position, member 74, connected to element D through a linkage comprising rod 82 and pin 84, is also in its initial position. Member 74 is divided into eight columns, each of which corresponds to one of the positions of element D.

Figure 6A:
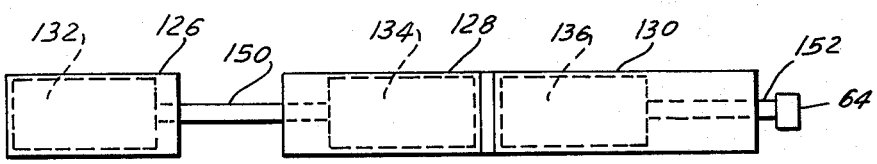
FIGS. 6A-6H are, respectively, schematic views of each of the eight positions of the piston-cylinder pairs.

FIG. 6A shows the initial or start position of the piston-cylinder pairs. Piston 132 is in its left-hand position within cylinder 126. Piston 134 is in its right-hand position with respect to cylinder 128 and cylinder 136 is in its left-hand position with respect to cylinder 130. When the photo cell is tripped, the actuation signal is generated by the counter and sensing means 88 will read the fist column of member 74 which is aligned with sensing means 88.

Figure 6B:
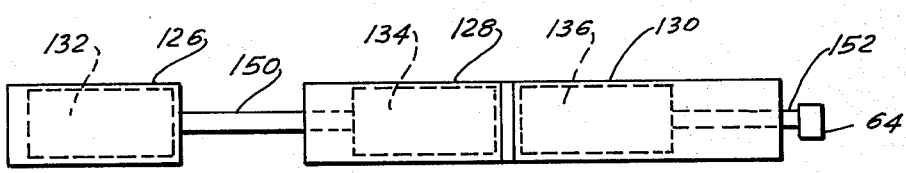

Column one of member 74 has an aperture aligned with aperture 96 on sensing means 88 causing the appropriate valve to connect the source of pressurized fluid to pneumatic conduit 112. This causes piston 132 to move one unit to the right within cylinder 126 and, thus, to the right-hand side thereof. The movement of piston 132 moves rod 150 and, thus, cylinders 128 and 130 are moved by the movement of rod 150 because the initial position of piston 134 within cylinder 128 is adjacent the far (right-hand) wall thereof and, thus, the movement of piston 134 in the rightward direction moves cylinders 128 and 130 one unit to the right. The movement of cylinder 130 causes the simultaneous movement of piston 136 therein, because the initial position of piston 136 is on the left-hand side of cylinder 130. The movement of piston 136 moves rod 152 and, thus, rod 152 is moved one unit to the right from its original position. This position is shown in FIG. 6B. In this position, the article is guided into the second lane.

The movement of rod 152 one unit to the right causes element D to likewise move. In addition, since element D is connected to bracket 76, the movement of element D causes the movement of member 74. Thus, as element D is displaced, so is member 74, and after the displacement of element D one unit to the right, the second column of member 74 is aligned with sensing means 88.

Figure 6C:
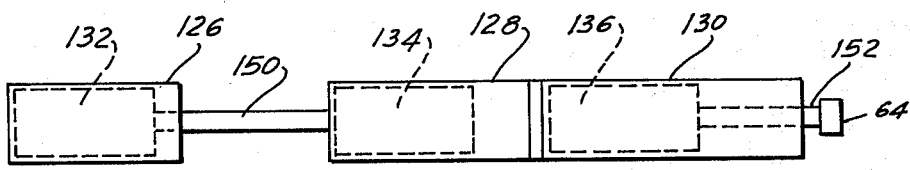

The second column of member 74 has apertures therein aligning with apertures 94 and 100 on sensing means 88. Therefore, when the actuation signal is generated by the counter as the photo cell detects the next article, pneumatic tubes 110 and 116 will be connected to the source of fluid pressure by the appropriate valve causing piston 132 to move to the left position with respect to cylinder 126 and piston 134 to move to the left with respect to cylinder 128. The leftward movement of piston 132 with respect to cylinder 126 causes piston 134 to move one unit to the left with respect to cylinder 128. The range of piston 134 with respect to cylinder 128 is two units and, thus, this does not cause any movement of cylinder 128 or cylinder 130. However, the pressurized fluid in conduit 116 causes piston 134 to move to its leftward position with respect to cylinder 128. In doing so, cylinder 128 is moved one unit to the right with respect to its previous position. The movement of cylinder 128 one unit to the right, in turn, moves cylinder 130 and piston 136 one unit to the right and, therefore, rod 152 is displaced an additional unit with respect to its previous position and two units with respect to its original position. This is shown in FIG. 6C. Thus, the article is guided into the third lane.

Figure 6D:
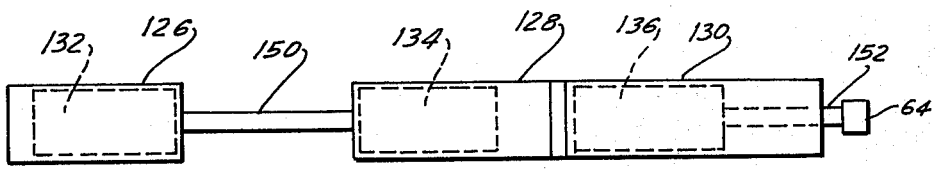

The movement of rod 152 to the right causes the third column of member 74 to align with sensing means 88. The third column of member 74 has an aperture therein which aligns with aperture 96 on sensing means 88. Thus, when the actuation signal is again generated by the counter as the photo cell detects an article, pneumatic conduit 112 is connected by the appropriate valve to the source of pressurized fluid, thus causing piston 132 to move to its rightward position with respect to cylinder 126 a distance of one unit. This movement causes rod 150 to move to the right a distance of one unit, thereby causing cylinder 128 and cylinder 130, as well as piston 136 and rod 152 to move to the right a distance of one unit. Thus, rod 152 has been moved to the right a distance of one unit with respect to its initial position. This is shown in FIG. 6D. Thus, the article is guided into the fourth lane.

The movement of rod 152 to the right three units with respect to its previous position causes column four of member 74 to align with sensing means 88. Column four of member 74 has apertures thereon which align with apertures 94, 98 and 104, respectively, on sensing means 88.

Figure 6E:
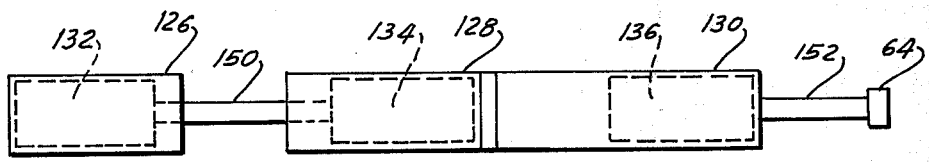

Thus, when the actuation signal is generated by the counter as the photo cell detects the next article, pneumatic conduits 110, 114 and 120 are connected by the appropriate valve to the source of pressurized fluid and piston 132 is moved to the left with respect to cylinder 126 a distance of one unit, piston 134 is moved to the right with respect to cylinder 128 a distance of two units, and piston 136 is moved to the right with respect to cylinder 130 a distance of four units. Thus, cylinders 128 and 130 are caused to return to their initial position with respect to the housing but piston 136 is four units to the right with respect to its original position and thus rod 152 is one unit to the right with respect to its previous position and four units to the right with respect to its original position. This is shown in FIG. 6E. Thus, the article is guided into the fifth lane.

The movement of rod 152 four units to the right with respect to its original position causes column five of member 74 to be aligned with sensing means 88. Column five of member 74 has apertures which align with apertures 96 and 102, respectively, on sensing means 88.

Figure 6F:
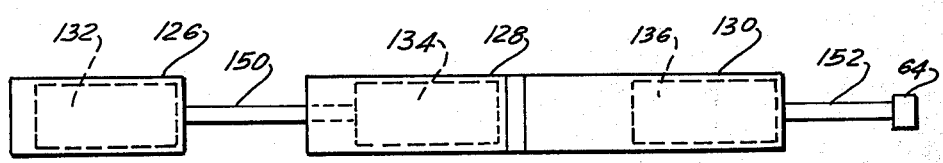

Thus, when the actuation signal is generated by the counter as the photo cell detects the next article, pneumatic conduits 112 and 102 are connected by the appropriate valve to the source of fluid pressure and cylinder 132 is moved to the right one unit with respect to cylinder 126 and thus cylinders 128 and 130 are moved to the right one unit with respect to their original position. Because of this, rod 152 is moved to the right one unit with respect to its previous position and five units with respect to its original position. This is shown in FIG. 6F. Thus, the article is guided into the sixth lane.

The movement of rod 152 five units to the right with respect to its original position causes column six of member 74 to align with sensing means 88. Column six of member 74 has apertures thereon which align with apertures 94 and 100, respectively, on sensing means 88.

Figure 6G:
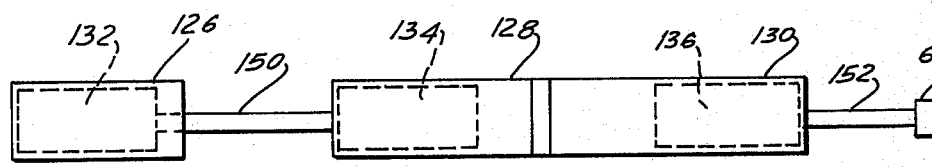

Thus, when the actuation signal is generated by the counter as the photo cell again detects an article, pneumatic conduits 110 and 116 are connected by the appropriate valve to the source of pressurized fluid and piston 132 is moved leftward with respect to cylinder 126 a distance of one unit. In addition, cylinder 128 is moved to the right two units with respect to piston 134. However, the movement of piston 132 one unit to the left also causes piston 134 to move one unit to the left and, therefore, the total displacement of cylinder 128 with respect to its previous position is one unit to the right. Thus, cylinder 130 is moved one unit to the right and so is rod 152. Therefore, rod 152 has moved six units to the right with respect to its original position. This is shown in FIG. 6G. Thus, the article is guided into the seventh lane.

The movement of rod 162 six units to the right with respect to its original position causes column seven on member 74 to align with sensing means 88. Column seven of member 74 has an aperture thereon which aligns with aperture 96 on sensing means 88.

Figure 6H:
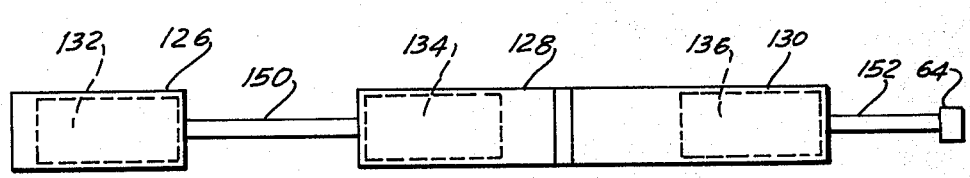

When the actuation signal is generated, pneumatic conduit 112 is connected by the appropriate valve to the source of pressurized fluid which causes piston 132 to move one unit to the right with respect to cylinder 126. This, in turn, causes cylinder 128, cylinder 130 and rod 152 each to move one unit to the right and, therefore, rod 152 has been displaced a total of seven units from its original position. This is shown in FIG. 6H. Thus, the article is guided into the eighth lane.

The movement of rod 152 seven units from its original position causes column eight of member 74 to align with sensing means 88. Column eight of member 74 has an aperture therein which aligns with aperture 108 on sensing means 88.

When the actuation signal is generated by the counter as the photo cell detects the next article, pneumatic conduit 124, connected to piston-cylinder pair 146, is connected by the appropriate valve to the source of fluid pressure thereby moving the piston in piston-cylinder pair 146 in a downward direction, as shown in FIG. 4. This moves sensing means 88 in a downward direction because sensing means 88 is connected to the piston of piston-cylinder pair 144 by means of a piston rod 148. The movement of sensing means 88 in the downward direction causes sensing means 88 to be aligned with a different set of apertures on member 74 which are vertically offset with respect to the apertures which align with the apertures on sensing means 88 when sensing means 88 was in the upward position. However, guide C has not been moved and the article is again guided into the eighth lane.

The movement of sensing means 88 in a downward direction with respect to column eight of member 74 causes an aperture in column eight of member 74 to align with aperture 94 on sensing means 88. When the actuation signal is generated as the photo cell detects the movement of an article, pneumatic conduit 110 is connected by means of the appropriate valve to the source of pressurized fluid and piston 132 is moved leftward one unit with respect to cylinder 126. Thus, cylinders 128 and 130 are moved leftward one unit with respect to their previous positions and rod 152 is now six units to the right with respect to its original position. See FIG. 6G. Thus, the article is guided into the seventh lane.

The movement of rod 152 to a position six units to the right of its original position causes the seventh column of member 74 to again align with sensing means 88. When the actuation signal is generated as the photo cell once again detects an article, sensing means 88 will sense the apertures in column seven of member 74 which are offset from the original set. These apertures will cause rod 152 to move an additional unit to the left with respect to its previous position and five units to the right with respect to its original position. See FIG. 6F. Thus, the article will be guided into the sixth lane.

Thus, each time the actuation signal is generated as the photo cell detects another article, the guide will be indexed one time to the left in sequence until the first column of member 74 is aligned with sensing means 88. This will occur after rod 152 is displaced in sequence five, four, three, two, one and zero units to the right from its original position, thus distributing articles in the fifth, fourth, third, second and first lanes, respectively. The first column of member 74 has only a single aperture therein in the offset set, that aperture aligning with aperture 106 on sensing means 88. When the actuation signal is again generated, conduit 122 is connected by the appropriate valve to the source of the pressurized fluid. This, in turn, will cause the piston within cylinder-piston pair 146 to move in a vertically upward direction thereby causing sensing means 88 to once again align with the apertures in the original set. This will not cause guide C to move and thus the article could again be guided into the first lane. Since there is an aperture in the original set which aligns with aperture 96 on sensing means 88, the next actuation signal generated will cause rod 152 to move from its original position one unit to the right, thereby starting the sequence over again.

It should be noted that as described herein, the apparatus is programmed to cause the exit end of the guide C to register with each one of eight article travel paths in sequence. At the eighth travel path, the sequence is reversed, thus causing alignment with each of the eight travel paths again, but this time in a reverse order. Thus, each of the travel paths at the extreme ends of the range has two articles directed therein in sequence. If it were not so, the intermediate travel paths would each have one article directed thereto for each half-cycle, but the travel paths at the extremes of the set would have an article directed therein only once every cycle.

It should be understood that the particular programming described herein is described for purposes of illustration only and this program may be varied to accommodate different numbers of travel paths, different sequences of distribution and different numbers of bottles distributed in each lane during each shift position, as desired.

The present invention, therefore, is a means of distributing articles into a selected article travel path. The distribution is controlled by means of a programming member which may be programmed in any desired sequence thus permitting great versatility in distribution. In addition, the apparatus has a unique pneumatic mechanism for controlling the movement of the guide and, in addition, adjustment capability such that the apparatus can accommodate odd or even sets of travel paths and articles and travel paths of varying widths.

While only a single preferred embodiment of the present invention has been disclosed herein for purposes of illustration, it is obvious that various modifications and variations can be made thereto. It is intended to cover all of these modifications and variations which fall within the scope of the present invention as defined in the appended claims.

What is claimed is:

1. In an article moving means of the type having a structure with means thereon defining a plurality of paths for article travel, each of said paths beginning in a common area, means for conveying articles to said common area and for directing said articles into selected ones of said paths, said last mentioned means comprising a guide movably mounted on said structure and having an exit end selectively movable into registration with a selected one of said paths, the improvement comprising means for controlling the position of said guide, said control means comprising a programming member having first and second sets of programming elements spaced thereon, said sets of elements being offset from each other, means for sensing said elements, means for moving said guide in accordance with said sensed elements, means for causing relative movement between said member and said sensing means between a first position wherein one of said sets is aligned with said sensing means as said guide is moved and a second position wherein the other of said sets is aligned with said sensing means as said guide is moved.

2. The apparatus of claim 1 wherein said second means for causing said relative movement moves said member to said first position when said guide is moved in one direction and to said second position when said guide is moved in a second direction.

3. The apparatus of claim 2 wherein said relative movement between said first and said second positions is substantially perpendicular to the movement of said programming member in accordance with said guide.

4. The apparatus of claim 2 wherein said relative movement between said first and said second positions is controlled by the sensing of programming elements in said programming member.

5. The apparatus of claim 4 further comprising means for moving said control means between a first position wherein said exit end of said guide is registerable with selected paths from a first set of paths and a second position wherein said exit end of said guide is registerable with selected paths from a second set of paths, the paths in said first set being displaced from the paths in said second set by a distance less than the width of a path.

6. The apparatus of claim 5 further comprising means for adjusting said guide moving means to accommodate travel paths of different widths.

7. In an article moving means of the type having a structure with means therein defining a plurality of paths for article travel, each of said paths beginning in a common area, means for conveying articles to said common area and for directing said articles into selected ones of said paths, said last mentioned means comprising a guide movably mounted on said structure and having an exit end selectively movable into registration with a selected one of said paths, the improvement comprising means for controlling the position of said guide, said control means comprising a programming member having programming elements spaced thereon, means for sensing said elements, means for moving said member relative to said sensing means, means for moving said guide in accordance with said sensed elements and means operably connecting said moving means to said guide such that said member moves in accordance with the position of said guide.

8. The apparatus of claim 7 further comprising means for moving said control means between a fitst position wherein said exit end of said guide is registerable with selected paths from a first set of paths and a second position wherein said exit end of said guide is registerable with selected paths from a second set of paths, the paths in said first set being displaced from the paths in said second set by a distance less than the width of a path.

9. The apparatus of claim 7 further comprising means for adjusting said guide moving means to accommodate travel paths of different widths.

10. The apparatus of claim 8 further comprising means for adjusting said guide moving means to accommodate travel paths of different widths.

11. The apparatus of claim 9 wherein said guide is pivotally mounted to said structure and said guide moving means comprises an element operatively connected to said guide at a point spaced from said pivot and means for displacing said element in accordance with said sensed programming element.

12. The apparatus of claim 11 wherein said adjusting means comprises means for moving the point of connection between said element and said guide with respect to said pivot point.

13. The apparatus of claim 7 wherein said guide moving means comprises an element operatively connected to said guide and means for displacing said element a given number of discrete distances.

14. The apparatus of claim 8 wherein said guide moving means comprises an element operatively connected to said guide and means for displacing said element a given number of discrete distances.

15. The apparatus of claim 9 wherein said guide moving means comprises an element operatively connected to said guide and means for displacing said element a given number of discrete distances.

16. In an article moving means of the type having a structure with means thereon defining a plurality of paths for article travel, each of said paths beginning at a common area, means for conveying articles to said common area and for directing said articles into selected ones of said paths, said last mentioned means comprising a guide movably mounted on said structure and having an exit end selectively movable into registration with a selected one of said paths, the improvement comprising means for controlling the position of said guide, said control means comprising a programming member having programming elements spaced thereon, means for sensing said elements, means for moving said guide in accordance with said sensed elements, means for adjusting said guide moving means to accommodate travel paths of different widths, said guide being pivotally mounted to said structure and said guide moving means comprising an element operably connected to said guide at a point spaced from said pivot, means for displacing said element in accordance with said sensed programming element, said adjusting means comprising means for moving the point of connection between said element and said guide with respect to said pivot point and means for varying the position of said control means as said point of connection is moved.

17. The apparatus of claim 16 wherein said guide moving means comprises an element operatively connected to said guide and means for displacing said element a given number of discrete distances.

18. The apparatus of claim 16 further comprising an element operatively connected to said guide for moving said guide to one of a plurality of discrete positions and means for displacing said element a given number of discrete distances, said displacing means comprising a housing, a first cylinder mounted on said housing and a second cylinder movably mounted relative to said housing, first and second pistons movably mounted within said cylinders, respectively, means for operatively connecting said pistons, first and second means for moving each of said pistons relative to said first and second cylinder, respectively, between first and second positions and means operatively connecting said element to said second cylinder.

19. The apparatus of claim 18 wherein said first piston is movable relative to said first cylinder a distance of X and wherein said second piston is movable relative to said second cylinder a distance of 2X.

20. The apparatus of claim 18 wherein said element connecting means comprises a third cylinder and a third piston movably mounted therein, said third cylinder being operatively connected to said second cylinder for movement therewith, and movably mounted relative to said housing, means for moving said third piston relative to said third cylinder between first and second positions and means for operatively connecting said element and said third piston.

21. The apparatus of claim 20 wherein said element connecting means comprises a third cylinder and a third piston movably mounted therein, said third cylinder being operatively connected to said second cylinder for movement therewith, and movably mounted relative to said housing, means for moving said third piston relative to said third cylinder between first and second positions and means for operatively connecting said element and said third piston.

22. The apparatus of claim 21 wherein said first, second and third pistons are movable relative to said first, second and third cylinders, respectively, a distance of X, 2X and 4X, respectively.

23. In an article moving means of the type having a structure with means thereon defining a plurality of paths for article travel, each of said paths beginning at a common area, means for conveying articles to said common area and for directing said articles into selected ones of said paths, said last mentioned means comprising a guide movably mounted on said structure and having an exit end selectively movable into registration with a selected one of said paths, the improvement comprising an element operatively connected to said guide for moving said guide to one of a plurality of discrete positions and means for displacing said element a given number of discrete distances, said displacing means comprising a housing, a first cylinder mounted on said housing and a second cylinder movably mounted relative to said housing, first and second pistons movably mounted within said cylinders, means for operatively connecting said pistons, first and second means for moving each of said pistons relative to said first and second cylinder, respectively, between first and second positions and means operatively connecting said element to said second cylinder.

24. The apparatus of claim 23 wherein said first piston is movable relative to said first cylinder a distance of X and wherein said second piston is movable relative to said second cylinder a distance of 2X.

25. The apparatus of claim 23 wherein said element connecting means comprises a third cylinder and a third piston movably mounted therein, said third cylinder being operatively connected to said second cylinder for movement therewith and movably mounted relative to said housing, means for moving said third piston relative to said third cylinder between first and second positions and means for operatively connecting said element and said thrid piston.

26. The apparatus of claim 24 wherein said element connecting means comprises a third cylinder and a third piston movably mounted therein, said thrid cylinder being operatively connected to said second cylinder for movement therewith and movably mounted relative to said housing, means for moving said third piston relative to said third cylinder between first and second positions and means for operatively connecting said element and said third piston.

27. The apparatus of claim 26 wherein said first, second and third pistons are movable relative to said first, second and third cylinders, respectively, a distance of X, 2X and 4X, respectively.

28. The apparatus of claim 27 wherein said given number is eight.

* * * * *